(12) United States Patent
Juhola et al.

(10) Patent No.: US 12,736,808 B1
(45) Date of Patent: Sep. 15, 2026

(54) FOLDED OPTICAL PATH HEADS-UP DISPLAY SYSTEM

(71) Applicant: Distance Technologies Oy, Helsinki (FI)

(72) Inventors: Mikko Juhola, Muurla (FI); Pekka Äyräs, Helsinki (FI); Olli Hakala, Helsinki (FI); Timo Vuorenpää, Helsinki (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/402,179

(22) Filed: Nov. 26, 2025

(51) Int. Cl.
*G02B 27/01* (2006.01)
*B60K 35/23* (2024.01)

(52) U.S. Cl.
CPC .......... *G02B 27/0101* (2013.01); *B60K 35/23* (2024.01); *B60K 2360/23* (2024.01); *B60K 2360/25* (2024.01); *G02B 2027/012* (2013.01); *G02B 2027/0123* (2013.01)

(58) Field of Classification Search
CPC .......... G02B 27/0101; G02B 2027/012; G02B 2027/0123; B60K 35/23; B60K 2360/23; B60K 2360/25
USPC .......................................................... 359/630
See application file for complete search history.

(56) References Cited

U.S. PATENT DOCUMENTS 7,982,959 B1 * 7/2011 Lvovskiy ............... G02B 27/01 349/9
2019/0278086 A1 * 9/2019 Ofir ........................ G02B 6/122
2022/0163816 A1 * 5/2022 Osmanis ............ G02B 27/0172
2023/0367149 A1 * 11/2023 Bregulla ............... G02F 1/1306
2024/0027761 A1 * 1/2024 Koran ............... B32B 17/10651
2025/0067978 A1 * 2/2025 Xu ......................... B60K 35/60
2025/0172803 A1 * 5/2025 Jarvenpaa ............ B60K 35/415

* cited by examiner

*Primary Examiner* — Mohammed A Hasan
(74) *Attorney, Agent, or Firm* — Ziegler IP Law Group, LLC.

(57) ABSTRACT

A heads-up display system, a first reflective interface is arranged obliquely along an optical path of light rays emitted from a display. A second transparent interface is obliquely oriented with respect to the optical path of the light rays reflected from the first reflective interface. The light rays are incident on the second transparent interface from within a first optical medium, whereby the light rays undergo total internal reflection. A third semi-reflective interface is arranged obliquely along the optical path of the light rays reflected from the second transparent interface. The third semi-reflective interface is oriented to reflect the light rays toward an eyebox of the heads-up display system, while optically combining the light rays with a real-world light field.

13 Claims, 9 Drawing Sheets

FOLDED OPTICAL PATH HEADS-UP DISPLAY SYSTEM

TECHNICAL FIELD

The present disclosure relates generally to heads-up display (HUD) systems and, more particularly, to folded optical path HUD systems. The present disclosure also relates to vehicles comprising such HUDs.

BACKGROUND

Modern vehicles increasingly incorporate heads-up display (HUD) systems to project navigation cues, warnings, and augmented-reality (AR) content directly into a user's field of view. Such systems improve situational awareness and safety by allowing the user to perceive both virtual and real-world content without shifting gaze away from the road.

However, conventional HUD architectures encounter several significant limitations:

1. Bulky optics for wide fields of view: HUD systems designed to generate three-dimensional imagery or wide-angle AR scenes often require long optical paths and large optical combiners. This results in deep instrument panel enclosures and restricts vehicle interior design flexibility.

2. Manufacturing challenges: Many HUD systems rely on curved or free-form optical combiners and large mirror assemblies. Such optical elements introduce assembly complexity, require tight tolerances, and increase manufacturing cost.

3. Optical distortions and artifacts: Curved optical combiners can produce image swim, ghost reflections, or non-uniform luminance, particularly in systems attempting to display autostereoscopic or multiscopic images.

4. Straylight and efficiency losses: Parasitic reflections along the optical path may introduce straylight into the eyebox, degrading image contrast. In addition, uncontrolled angular distribution of emitted light wastes optical power and increases thermal load.

Prior art designs, such as multi-mirror anastigmats, address only narrow fields of view, and do not adequately resolve the challenges of compactness and manufacturability for wide-angle HUD systems.

In light of the foregoing, there remains a need for a compact optical architecture that supports wide fields of view, reduces reliance on highly-curved optical surfaces, mitigates straylight, and is compatible with directional emission control at the display.

SUMMARY

The present disclosure seeks to provide a heads-up display system having a folded optical path capable of reducing volume and simplifying manufacture, while supporting wide fields of view. The aim of the present disclosure is achieved by a heads-up display system that employs a folded optical path including a first reflective interface, a second transparent interface configured for total internal reflection, and a third semi-reflective interface arranged to reflect light rays from a display toward an eyebox while optically combining the light rays with a real-world light field, as defined in the appended independent claims to which reference is made. Advantageous features, including the provision of a polarization-selective coating at the third semi-reflective interface, the use of curvature in only one meridional direction or a biconic surface form, configuring the display to emit light rays with an angular distribution more collimated in an orthogonal meridional direction, inclusion of a straylight blocking interface, and integration of multiple interfaces into a single optical structure, are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1A:
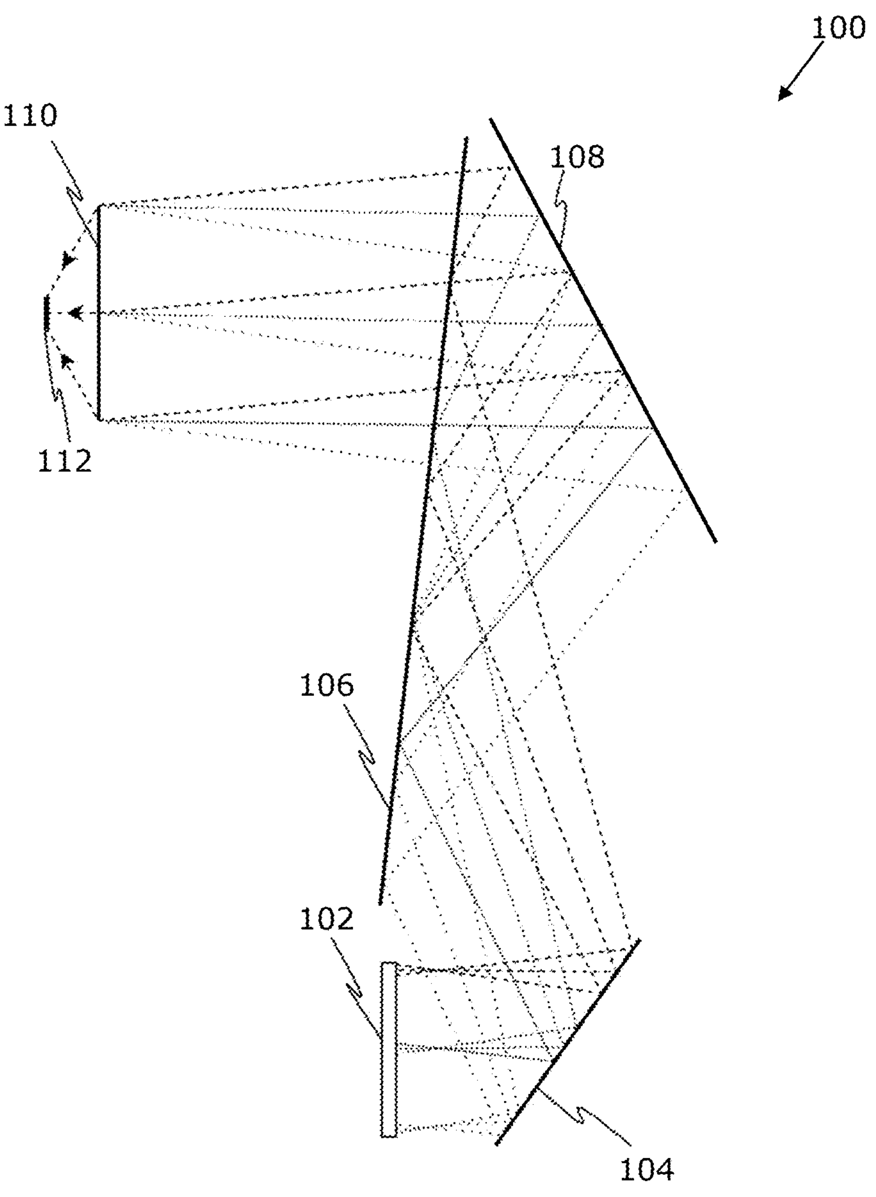
FIG. 1A is a schematic illustration of a heads-up display (HUD) system, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a heads-up display (HUD) system comprising:

- a display employed to emit light rays;
- a first reflective interface arranged obliquely along an optical path of the light rays emitted from the display;
- a second transparent interface being obliquely oriented with respect to the optical path of the light rays reflected from the first reflective interface, wherein the light rays, after reflection from the first reflective interface, are incident on the second transparent interface from within a first optical medium, the second transparent interface being a boundary between the first optical medium having a first refractive index (n1) and a second optical medium having a second refractive index (n2) that is smaller than the first refractive index, and wherein the light rays are incident on the boundary at angles greater than a critical angle for the first optical medium and the second optical medium, whereby the light rays undergo total internal reflection; and a third semi-reflective interface arranged obliquely along the optical path of the light rays reflected from the second transparent interface, the third semi-reflective interface being oriented to reflect the light rays toward an eyebox of the HUD system, while optically combining the light rays with a real-world light field.

In a second aspect, an embodiment of the present disclosure provides a vehicle comprising the heads-up display system of the aforementioned first aspect.

Pursuant to the present disclosure, the heads-up display (HUD) system reduces optical volume and simplifies integration into a vehicle while maintaining a wide field of view and high optical quality. This is achieved by employing a folded optical path defined by three cooperating interfaces: a first reflective interface that redirects light rays emitted from the display, a second transparent interface that supports total internal reflection (TIR) for compact folding, and a third semi-reflective interface that delivers the light rays into the eyebox while optically combining them with the real-world light field.

By relying on total internal reflection at the second transparent interface, the HUD system avoids the need for additional coated mirrors or bulky refractive elements to fold the optical path. TIR provides near-lossless reflection across the full design field, thereby improving optical efficiency and luminance uniformity compared to conventional HUD arrangements that depend on multiple metallic or dielectric-coated reflectors. The use of TIR also ensures high stability against angular variation, reducing ghost reflections and improving daylight contrast in the presence of strong ambient illumination.

The third semi-reflective interface is oriented obliquely to combine the light rays with the real-world light field. Because the third semi-reflective interface may be integrated into a windshield of a vehicle, the HUD system minimizes the number of additional optical elements required in the cabin of the vehicle, thereby reducing packaging depth, weight, and cost. The architecture of the HUD system is particularly advantageous in applications requiring large virtual image depths and wide viewing zones, where traditional mirror-based HUD systems become prohibitively bulky. Moreover, the folded optical path configuration mitigates optical distortions associated with free-form curved combiners. Since at least two of the aforementioned three interfaces are flat, or nearly flat, alignment and manufacturing tolerances are eased. This directly reduces image swim, ghosting, and colour shifts that commonly arise in curved-combiner HUD systems. The result is a stable, high-contrast image that maintains accurate registration with the real-world scene across the supported eyebox.

Accordingly, the disclosed HUD system enables a thinner, more manufacturable optical package that supports wide fields of view while maintaining image fidelity. This provides clear functional advantages over prior HUD systems, which typically compromise between compactness and optical performance.

It will be appreciated that the HUD system is suitable for implementation in various kinds of vehicles, including automobiles, aircraft, watercraft, and other transport platforms having a transparent or semi-transparent windshield or other windows. For example, the windshield may correspond to a front windshield of an automobile or to a canopy, cockpit window, or transparent visor of an aircraft.

For illustration purposes only, there will now be described exemplary ways of implementing various components of the HUD system. As used herein, the term "interface" refers to an optical boundary at which a change in refractive, reflective, or transmissive properties occurs, and includes both external surfaces and internal material boundaries. An interface may, for example, correspond to:

- a surface carrying a reflective, semi-reflective, or polarization-selective coating;
- an uncoated material boundary between two optical media having different refractive indices, where transmission or reflection occurs by refraction or total internal reflection (TIR); or
- a multilayer or thin-film region that produces reflection, transmission, or polarization selectivity by interference or absorption.

Accordingly, the term "interface" encompasses both coated and uncoated optical boundaries and is not limited to external physical surfaces.

As used herein, the term "eyebox" refers to a three-dimensional volume within which a user's eyes can be positioned to view images displayed by the HUD system. The size and shape of the eyebox determine the allowable range of head movement while maintaining a clear view of the images.

First Reflective Interface:

The first reflective interface redirects the light rays emitted from the display toward the second transparent interface, establishing a first fold of the optical path of the light rays. The first reflective interface can be implemented as a planar mirror deposited on a surface of a substrate made of glass or polymer. Reflectivity may, for example, be achieved through a metallic coating (such as aluminium or silver) with a protective dielectric overcoat; a dielectric multilayer stack designed for high reflectivity across the visible spectrum; or a hybrid coating combining both metallic coating and dielectric layers for polarization or wavelength control. The reflectivity of the first reflective interface may exceed 90 percent across the visible spectrum, ensuring efficient folding of the optical path without perceptible luminance loss.

In some embodiments, the first reflective interface is integrated into a same optical structure as the second transparent interface, wherein a reflective coating of the first reflective interface is deposited directly on one facet of the substrate.

An angular orientation of the first reflective interface is selected to balance length of the optical path and the field of view, while ensuring that the light rays reflected from the first reflective interface meet the critical-angle condition for TIR at the second transparent interface. In this regard, a surface normal of the first reflective interface forms a first obtuse angle with a surface normal of the display. The first obtuse angle lies within a range of 135 degrees to 150 degrees. In other words, if the display and the first reflective interface are both planar, they would form a physical angle that lies in a range of 30 degrees to 45 degrees. This orientation establishes the first fold of the optical path, directing the light toward the second transparent interface at the incidence angles required for total internal reflection.

Second Transparent Interface:

The second transparent interface is a boundary between the first optical medium and the second optical medium such that the light rays incident from within the first optical medium exceed the critical angle and undergo total internal reflection (TIR). The first optical medium can be implemented as an optical substrate made of glass or polymer, while the second optical medium can be implemented as air or a low-index adhesive. Examples of materials that are suitable for the first optical medium include, but are not limited to, BK7 glass, borosilicate glass, polycarbonate, acrylic (PMMA), or high-index optical polymers such as ZEONEX© or TOPAS©.

The second transparent interface may be polished to optical flatness. Moreover, the second transparent interface may have a slight curvature if field curvature compensation is needed. The first refractive index (n1) of the first optical medium may lie between 1.6 and 1.8, while the second refractive index (n2) of the second optical medium may be below 1.5, ensuring a sufficient TIR margin across the field of view.

By using TIR instead of a coated mirror, the second transparent interface provides high-efficiency reflection with negligible absorption (typically below 1 percent) and minimal spectral distortion. The second transparent interface thus provides a second fold of the optical path by reflecting the light rays via total internal reflection toward the third semi-reflective interface with minimal loss.

A surface normal of the second transparent interface is arranged at a second obtuse angle with respect to the surface normal of the first reflective interface. The second obtuse angle is selected to complement the first obtuse angle between the display and the first reflective interface, such that light rays reflected from the first reflective interface impinge on the second transparent interface at the desired range of incidence angles for total internal reflection. In some implementations, the second obtuse angle may be approximately equal to, or slightly larger than, the first obtuse angle, depending on the refractive index of the first optical medium and the desired field-of-view geometry. Adjusting the second obtuse angle in coordination with the refractive index enables fine control of the folded optical path compactness and ensures that total internal reflection is maintained for the full angular span of the light rays.

In this regard, the angular orientation of the first reflective interface and the refractive index of the first optical medium may be jointly designed such that the entire desired field of view satisfies the total-internal-reflection condition at the second transparent interface. In particular, the marginal field rays corresponding to the extreme horizontal and vertical limits of the FOV are incident on the second transparent interface at angles that remain above the critical angle determined by the refractive-index ratio between the first optical medium and the second optical medium. This design ensures that all image-forming light rays undergo TIR, maintaining luminance uniformity and preventing vignetting or brightness roll-off at the field edges. In some implementations, these angular relationships may be analytically expressed using Snell's law and the critical-angle equation, permitting optimization of the refractive indices and relative orientations of the second transparent interface and the first reflective interface for the target FOV during optical design. In practice, the design process may involve jointly optimizing the first reflective-interface orientation and the refractive index of the first optical medium so that all image-forming field rays across the desired field of view meet the total-internal-reflection condition. Analytical relationships between the first obtuse angle, the second obtuse angle, and the refractive-index ratio (n1/n2) can thus be used to define the allowable design space during optical simulation.

In some implementations, the second transparent interface is arranged between the display and the first reflective interface such that the light rays emitted from the display pass through the second transparent interface toward the first reflective interface and, after reflection from the first reflective interface, are incident on the second transparent interface from within the first optical medium. This spatial arrangement establishes a bidirectional optical function of the second transparent interface.

Such an arrangement provides several technical benefits. First, the same second transparent interface serves as both an in-coupling boundary for the light rays (first pass, transmission) and a folding reflector (return pass, total internal reflection), thereby eliminating a separate in-coupling plate and reducing part count, optical thickness, and cost. Second, because the second transparent interface lies physically between the display and the first reflective interface, it can be formed on a facet of a common optical substrate that also carries the first reflective interface and, optionally, the third semi-reflective interface. This physical adjacency facilitates integration of the interfaces into a single optical structure with inherently fixed alignment. Third, the first transmission encounter at the second transparent interface can include an anti-reflection (AR) coating on the side facing the second optical medium (low-index side) to suppress Fresnel losses, while the return pass exploits total internal reflection, which is nearly lossless. As a result, higher luminance is achieved for the same display power, with reduced colour shift relative to coated-mirror implementations. Fourth, placing the second transparent interface between the display and the first reflective interface shortens the free-space leg between these components and removes an extra air-gap window, enabling a shallower HUD module and simplifying dashboard integration. Fifth, this arrangement ensures that the return angles after the first reflection are naturally steered into a designed acceptance cone at the second transparent interface, maintaining the condition that the incidence angles exceed the critical angle across the full field of view. This improves edge luminance uniformity and reduces vignetting sensitivity. Sixth, when the second transparent interface and the first reflective interface are implemented on facets of a single optical substrate, the transmission and TIR encounters occur on surfaces having fixed relative orientation, improving optical stability under vibration and temperature variations and reducing the need for re-alignment.

Third Semi-Reflective Interface:

The third semi-reflective interface is arranged to reflect the light rays (received upon reflection from the second transparent interface) toward the eyebox, while allowing the real-world light field to pass through, thereby optically combining virtual and real-world imagery. In the folded optical path, the third semi-reflective interface provides a third fold of the optical path, directing the light rays toward the user, while simultaneously transmitting the real-world light field.

In some implementations, the third semi-reflective interface is formed directly on a windshield of a vehicle in which the HUD system is installed. This enables the windshield itself to serve as the optical combiner. Optionally, in such a case, the third semi-reflective interface is a user-facing surface of the windshield of the vehicle in which the HUD system is installed.

Forming the third semi-reflective interface directly on the windshield eliminates the need for a separate support structure, thereby reducing the overall optical stack thickness and vehicle-dashboard volume. Integration with the windshield ensures that the third semi-reflective interface naturally follows the existing curvature of the windshield, aligning the reflected imagery with the user's sightline without additional alignment steps. Because the windshield is a mechanically stable structural element, the optical geometry of the HUD system remains invariant under vibration and temperature changes, improving image stability and long-term calibration accuracy.

In other implementations, the third semi-reflective interface is provided on a separate optical element rather than directly on the windshield. In such implementations, the separate optical element may be a flat or slightly curved glass plate mounted between a dashboard and the windshield of the vehicle. This allows the separate optical element to be replaced or upgraded independently of the vehicle windshield.

The third semi-reflective interface may comprise a thin-film dielectric coating with approximately 20-50 percent reflectivity across the visible spectrum, or a wavelength-selective coating tailored to the emission band of the display.

In some implementations, the third semi-reflective interface comprises a polarization-selective coating that reflects light rays having a polarization orientation within a predefined range. In such implementations, the display is configured to emit the light rays having a polarization orientation within the predefined range. In such a case, the polarization-selective coating transmits light rays having another polarization orientation orthogonal to the polarization orientation that lies within the predefined range.

The polarization-selective coating may be implemented as a dielectric multilayer stack, a wire-grid polarizer, or a hybrid thin-film structure combining polarization and wavelength selectivity. As an example, the polarization-selective coating may include alternating layers of titanium dioxide ($TiO_2$) and silicon dioxide ($SiO_2$) or equivalent high- and low-index materials. The thicknesses of the alternating layers are chosen to produce constructive interference for the polarization orientation that is to be reflected and destructive interference for the another polarization orientation that is to be transmitted. The polarization-selective coating can be optimized for s-polarized reflection and p-polarized transmission (or vice versa), depending on the polarization state of the light rays emitted by the display.

The predefined range of the polarization bandwidth for the polarization-sensitive coating may cover the visible spectrum (e.g., 450-650 nanometres), while maintaining a reflectivity of approximately 25 to 50 percent for the polarization orientation in the predefined range. For incident angles between ±5 degrees about an optical axis of the third semi-reflective interface, the reflectivity variation may remain within ±5 percent, ensuring uniform brightness across the field of view.

In such implementations, the display may either comprise a linear polarizer and a polarized backlight, or be implemented as an emissive display (such as an Organic light-emitting diodes (OLED)-based display or a micro-LED-based display) that is inherently polarized. As an example, a liquid-crystal-based display can include an output polarizer aligned to the predefined range of the polarization bandwidth of the polarization-sensitive coating. As another example, an OLED-based display may include a micro-polarizer film deposited at an exit aperture. The polarization-selective coating in the third semi-reflective interface improves image efficiency, contrast, and ambient transparency compared with non-selective half mirrors. By reflecting only the polarization orientation within the predefined range and transmitting its orthogonal counterpart, the third semi-reflective interface provides high reflectivity for the light rays emitted from the display, while preserving high transmission for ambient light, resulting in a clearer see-through appearance under daylight conditions.

Because reflection and transmission are separated by polarization rather than by a fixed intensity ratio, the optical losses are significantly reduced as compared to non-selective half mirrors. As a result, the virtual imagery achieves higher luminance for the same display power, reducing thermal load and extending component lifetime.

The polarization selectivity also mitigates ghost reflections that arise from multiple internal surfaces. Unwanted back-reflections typically experience a change in polarization state upon each interaction with dielectric boundaries; such rays are therefore transmitted rather than reflected by the polarization-selective coating, preventing their reflection toward the eyebox. This produces a cleaner virtual imagery and improved image contrast, particularly in bright ambient environments.

When the polarization-selective coating is optimized for angle-insensitive operation (for example, maintaining reflectivity variation within ±5 percent over ±5 degrees of incidence), the HUD system maintains consistent colour and brightness across the field of view and for varying user positions within the eyebox. Moreover, because the third semi-reflective interface transmits most of the unpolarized real-world light, the user perceives the real-world scene with minimal polarization-induced darkening or colour shift, maintaining natural transparency provided by the third semi-reflective interface.

Moreover, in some implementations, the third semi-reflective interface has a curvature in a first meridional direction. The first meridional direction corresponds to a vertical axis (namely, a Y-axis) of the eyebox of the HUD system. In the folded optical path, the curvature of the third semi-reflective interface determines the final image-forming geometry, controlling vertical focus and horizontal magnification across the eyebox. The curvature in the first meridional direction enables alignment of the virtual image plane with the user's eyes across the vertical extent of the field of view, ensuring that the perceived image remains uniformly focused and properly registered with the external scene, while maintaining a wide horizontal field of view.

While the third semi-reflective interface is curved in the first meridional direction, it may or may not be curved in a second meridional direction that is orthogonal to the first meridional direction. In this context, having curvature in only the first meridional direction means that the shape varies along the first meridional direction (corresponding to the vertical Y-axis of the eyebox), while remaining substantially flat along the second meridional direction (corresponding to the horizontal X-axis).

For example, when the HUD system is integrated into a vehicle where the curvature of the windshield is predominantly along the vertical axis, the first meridional direction corresponds to the vertical (Y) axis, while the second meridional direction corresponds to a horizontal axis (namely, an X-axis). The radius of curvature ($R_y$) in the first meridional direction may lie in a range from 0.5 metres to 2 metres, while the radius of curvature ($R_x$) in the second meridional direction may exceed 2 metres or be effectively infinite. When the third semi-reflective interface is formed on a windshield of a vehicle, the inherent curvature of the windshield may naturally realize the curvature in the first meridional direction.

Providing the third semi-reflective interface with a curvature in the first meridional direction improves focus consistency and optical uniformity across the eyebox, while maintaining manufacturability. Having curvature only along the first meridional direction simplifies fabrication and coating uniformity, allowing the third semi-reflective interface to be made using standard optical manufacturing processes at lower cost.

When the third semi-reflective interface is flat along the second meridional direction (orthogonal to the first meridional direction), a wide horizontal viewing range is preserved while avoiding astigmatism or lateral distortion that would occur in dual-axis curvature designs. Such a single-axis curvature compensates for field curvature or focus variation along the first meridional direction, so that virtual imagery appears at a consistent apparent distance across the user's vertical field of view. Furthermore, by concentrating optical power primarily along the first meridional direction (vertical axis), the third semi-reflective interface effectively limits the vertical angular spread of the reflected light rays. This controlled confinement reduces stray emission outside the intended eyebox, thereby increasing luminance efficiency and apparent image brightness. The result is a brighter image within the eyebox, without increasing display power consumption or adding additional reflective surfaces.

When integrated into a windshield, the curvature in the first meridional direction follows the existing contour of the windshield, enabling compact packaging and alignment with the user's natural sightline. The result is a stable, sharp, and well-registered image with reduced visual distortion and minimal assembly complexity.

Additionally, optionally, the third semi-reflective interface is a biconic surface having the curvature in the first meridional direction. More optionally, the third semi-reflective interface is a biconic surface having a distinct curvature in the second meridional direction in addition to the curvature in the first meridional direction.

The biconic surface form allows independent control of optical power in both meridional directions, enabling correction of asymmetric aberrations arising from the oblique geometry of the folded optical path or from the compound curvature of a windshield. For example, the radius of curvature (Ry) in the first meridional direction may be approximately 1 metre, while the radius of curvature (Rx) in the second meridional direction may lie in a range from 2 metres to 4 metres. In such a configuration, the curvature is dominant in the first meridional direction and nearly flat in the orthogonal meridional direction, producing a controlled vertical focusing effect while preserving horizontal image uniformity.

Implementing the third semi-reflective interface as a biconic surface having a curvature in the first meridional direction enables simultaneous correction of aberrations in both meridional directions while maintaining compact system geometry. By independently selecting the radii of curvature Rx and Ry, the biconic surface corrects astigmatism, distortion, and magnification asymmetry that arise from off-axis projection in wide-field HUD systems. The stronger curvature in the first meridional direction compensates for vertical field curvature, while the weaker curvature in the second meridional direction flattens the horizontal image geometry, resulting in consistent focus and proportional scaling across the entire field of view.

This geometry yields high-fidelity virtual imagery with uniform sharpness and low distortion, without requiring additional corrective optics such as relay lenses or secondary mirrors, thus reducing system thickness and alignment complexity. From a manufacturing perspective, biconic surfaces are analytically defined and reproducible, offering a balance between the simplicity of cylindrical surfaces and the flexibility of free-form optics.

Accordingly, providing the third semi-reflective interface with curvature in the first meridional direction, or as a biconic surface having such curvature, achieves a favourable balance between optical correction and manufacturability. The resulting folded optical path maintains compactness and alignment precision while delivering stable, high-contrast virtual imagery across the full field of view.

Additionally, optionally, the display is configured to emit the light rays having an angular distribution that is more collimated in the second meridional direction orthogonal to the first meridional direction. In other words, the display is configured to emit the light rays that are narrower in angular distribution along the second meridional direction (horizontal, X axis) and broader along the first meridional direction (vertical, Y axis).

The anisotropic emission described in this implementation complements the curvature of the third semi-reflective interface described above, with the more-collimated horizontal emission aligning with the wide-field horizontal meridional direction of the third semi-reflective interface, and the less-collimated vertical emission accommodating the curvature and vertical tolerance of the eyebox.

Such anisotropic emission can be achieved in several ways. In a first example implementation, the display may comprise a lenticular array comprising a plurality of vertically-aligned lenticular lenses, wherein the lenticular array is arranged on an optical path of a light-emitting panel of the display. Each lenticular lens collimates light in the horizontal axis, while allowing a wider divergence along the vertical axis. The focal length and pitch of the lenticular lenses can be selected according to the pitch of the light-emitting cells of the display, to maintain uniform brightness across the eyebox.

In a second example implementation, the display may comprise a microlens array or a micro-optical structure with directional transmission, such as a holographic diffuser or a prismatic film. As an example, the microlens array or the micro-optical structure can be designed to provide a half-angle divergence of ±5 degrees horizontally and ±15 degrees vertically, or other similar ratios.

In a third example implementation, the display may comprise a directional backlight. For liquid-crystal or liquid-crystal-on-silicon (LCoS) displays, the backlight may include a light-guide plate with angular extraction patterns that preferentially emit light into a limited horizontal cone.

In a fourth example implementation, the display may be implemented as an emissive display, such as a micro-OLED-based display or a micro-LED-based display. The emission pattern of the display can be shaped by integrated micro-optics or micro-reflector structures deposited over each light-emitting cell, producing the desired horizontal collimation profile.

The orientation of the anisotropy is selected such that the more-collimated second meridional direction (horizontal axis) corresponds to the wide-field dimension of the HUD system. The less-collimated first meridional direction (vertical axis) accommodates the natural vertical tolerance of the position of the user's head within the eyebox and the curvature of the third semi-reflective interface.

When the third semi-reflective interface includes a polarization-selective coating as described earlier, the display may also comprise a polarizing film aligned to the polarization orientation of the predefined range, ensuring that the angular distribution and polarization orientation are jointly optimized for maximum reflection efficiency.

Configuring the display to emit light rays with an angular distribution more collimated in the second meridional direction (horizontal axis) enhances optical efficiency, image uniformity, and straylight control in the folded HUD architecture. By narrowing the horizontal angular spread, a greater portion of emitted light enters acceptance cones of the first reflective interface and the second transparent interface. This ensures that a larger fraction of the light rays undergoes total internal reflection (TIR) at the second transparent interface, improving luminance efficiency and reducing stray reflections that could otherwise escape the optical path.

At the same time, maintaining a broader vertical emission supports an adequate vertical eyebox, accommodating variations in user height and head position. This anisotropic emission therefore balances optical efficiency with user tolerance, enabling bright imagery over a comfortable eyebox without unnecessary power loss.

The horizontal collimation also stabilizes the incident angle on the third semi-reflective interface, minimizing angular colour shift and ensuring consistent reflectivity across the field of view, especially important when the third semi-reflective interface uses polarization-selective or wavelength-selective coatings.

Furthermore, the directional emission pattern reduces parasitic inter-reflection within the folded optical path. Because most light rays propagate near a design axis of the folded optical path, spurious reflections at off-angle surfaces are inherently suppressed, improving contrast and eliminating veiling glare.

From a design perspective, the use of lenticular or micro-optical elements allows the display's emission anisotropy to be realized without increasing the optical path length or adding bulk. These microstructures can be replicated or embossed using standard display-manufacturing techniques, maintaining compatibility with thin-form HUDs.

Furthermore, the described anisotropic emission pattern makes the HUD system inherently compatible with autostereoscopic and multiscopic display architectures, such as those employing lenticular arrays, parallax barriers, or directional backlight units. In such configurations, the horizontally collimated emission aligns with the directional light-field generation of the autostereoscopic display, ensuring that the emitted light rays are accurately directed toward the user's eyes. The broader vertical emission, in turn, preserves vertical tolerance for user head movement and windshield curvature. Accordingly, the combination of the folded optical path with anisotropic emission enables the HUD system to support multiscopic or pseudo-multiscopic rendering without increasing system depth or requiring additional optical elements, thereby extending applicability to advanced AR-HUD designs.

Accordingly, configuring the display to emit light rays with an angular distribution that is more collimated in the second meridional direction enhances brightness and contrast, improves angular efficiency at the second transparent interface, stabilizes image performance across the eyebox, and preserves a compact, manufacturable folded optical architecture.

Furthermore, in some implementations, the first reflective interface, the second transparent interface and the third semi-reflective interface are integrated into a single optical structure. Such integration may be realized by fabricating these interfaces on, or within, a common optical structure. As an example, the first reflective interface can be formed on a first facet of the substrate through deposition of a metallic or dielectric mirror coating, while the second transparent interface is realized as a second facet or an internal boundary of the same substrate that supports total internal reflection (TIR). The third semi-reflective interface may then be provided on a third facet of the substrate.

As another example, the first reflective interface, the second transparent interface and the third semi-reflective interface may be fabricated in a laminated stack of optical sheets bonded by optical adhesives. In this case, the first reflective interface is deposited on a first sheet, the second transparent interface is defined at a boundary between sheets of differing refractive indices, and the third semi-reflective interface is formed on an outermost sheet. Integration may be achieved through precision moulding, direct coating on a moulded substrate, and optical cementing, depending on the material used for the optical sheets. Mechanical features such as alignment pins or moulded bosses can be incorporated into the optical structure to ensure accurate placement relative to the display and vehicle chassis.

Integrating the first reflective interface, the second transparent interface, and the third semi-reflective interface into a single optical structure provides significant optical, mechanical, and manufacturing advantages. By unifying the three interfaces within one substrate or laminate, the HUD system reduces the number of alignment degrees of freedom, ensuring precise angular registration between successive reflections. This minimizes image misregistration, ghosting, and field distortion that could otherwise arise from mechanical tolerance stack-up between discrete optical elements.

From an optical perspective, the integrated optical structure maintains the designed geometry of the folded optical path with higher stability over temperature and vibration. Because the refractive and reflective interfaces share a common body, the relative spacing and angular orientation remain fixed, ensuring consistent total-internal-reflection conditions at the second transparent interface and stable focus at the third semi-reflective interface. This yields improved image repeatability and contrast across manufacturing units.

Mechanically, a single integrated optical structure significantly reduces packaging depth and part count. The HUD system can be mounted as a compact module without separate mirror brackets or optical combiners, freeing instrument-panel space and simplifying vehicle integration. This compactness also improves resistance to vibration and reduces the need for realignment over the vehicle's lifetime.

Manufacturing efficiency is likewise enhanced. Integrating multiple optical functions within a single moulded or laminated component allows batch fabrication, coating, and inspection. Fewer optical adhesives and fewer assembly steps lower cost and improve yield. Furthermore, thermal expansion is more uniform across the structure, preventing stress birefringence and maintaining optical quality.

Accordingly, the integration of the first reflective interface, the second transparent interface, and the third semi-reflective interface into a single optical structure provides a robust, space-efficient, and manufacturable architecture that preserves high optical performance while simplifying assembly and improving long-term stability in vehicular HUD applications.

Moreover, optionally, the HUD system further comprises a straylight blocking interface arranged opposite to the second transparent interface, between the first reflective interface and the third semi-reflective interface. The geometry of the straylight blocking interface is selected so that it subtends a peripheral region through which stray reflections from the first reflective interface or from an outer surface of the second transparent interface could otherwise reach the third semi-reflective interface.

The straylight blocking interface may be implemented as an absorptive or light-shielding region that intercepts parasitic light rays which do not contribute to image formation. In one example implementation, the straylight blocking interface comprises a light-absorbing coating (for example, a blackened or matte-finished layer) applied to a facet of the optical structure located opposite to the second transparent interface. Such a coating may include evaporated chromium black, carbon-loaded polymer, or a multilayer anti-reflection (AR) and absorber stack optimized for the visible spectrum.

In laminated or moulded implementations, the straylight blocking interface may comprise a thin interlayer of absorptive adhesive or a black polymer film embedded within the optical structure. When the first reflective interface, the second transparent interface and the third semi-reflective interface are integrated into a single optical structure, the straylight blocking interface can be incorporated as a patterned coating or insert between the corresponding layers, without increasing the external thickness of the optical structure.

The optical density (OD) of the straylight blocking interface may be greater than 3 across the visible range, corresponding to a residual transmission below 0.1 percent. The surface roughness of the absorbing layer may exceed 200 nm RMS to promote diffuse scattering rather than specular reflection, further suppressing ghost images.

The inclusion of the straylight blocking interface substantially improves image contrast, visual clarity, and daytime legibility of the HUD system by preventing unwanted reflections from reaching the eyebox. In the folded optical architecture, multiple planar boundaries are present; secondary reflections from the non-TIR side of the second transparent interface, or from uncoated facets of the first reflective interface, can propagate toward the third semi-reflective interface and create ghost images, veiling glare, or luminance halos. The straylight blocking interface intercepts these secondary reflections at an early stage, ensuring that only the intended light path defined by the first reflective interface, the second transparent interface, and the third semi-reflective interface contributes to image formation.

Because the straylight blocking interface is positioned opposite to the second transparent interface, it effectively captures both forward and backward stray reflections, including rays that might otherwise emerge due to imperfect TIR, scattering at surface defects, or reflection from mounting features. This results in a higher contrast ratio and improved black-level performance, particularly under strong ambient illumination.

From a mechanical perspective, the straylight blocking interface can also serve as an alignment reference or adhesive layer, simplifying assembly when multiple interfaces are integrated into a single optical structure. It eliminates the need for separate absorbing housings or external baffles, thus preserving the compactness and manufacturability of the folded design.

In bright-day and night-driving conditions alike, the presence of the straylight blocking interface ensures that the virtual imagery appears crisp and free of secondary reflections, enhancing the perceptual realism and safety of the HUD display.

Accordingly, the provision of the straylight blocking interface between the first reflective interface and the third semi-reflective interface provides a localized optical barrier that maintains high contrast and colour fidelity while preserving the slim, manufacturable architecture of the folded HUD system.

Optionally, the straylight blocking interface comprises:

- a first part arranged laterally offset from the optical path of the light rays reflected from the first reflective interface toward the second transparent interface; and
- a second part arranged laterally offset from the optical path of the light rays reflected from the second transparent interface toward the third semi-reflective interface.

In this regard, the straylight blocking interface may be divided into spatially distinct parts positioned along the folded optical path to intercept parasitic light that arises from different reflection stages. The first part of the straylight blocking interface is located adjacent to, but not in contact with, the first reflective interface. Its purpose is to intercept light that is scattered or partially reflected from the first reflective interface at off-design angles, such as light that fails to meet the critical-angle condition for total internal reflection at the second transparent interface. The first part may be realized as a matte-black mask printed or deposited along the lateral margins of an active optical aperture, or as an absorptive insert moulded into the optical structure adjacent to the first reflective interface.

The second part of the straylight blocking interface is positioned near an outgoing portion of the folded optical path, typically opposite to the second transparent interface and in the region between the second transparent interface and the third semi-reflective interface. It blocks residual rays arising from partial reflections at the non-TIR side of the second transparent interface, micro-facet scattering, or reflection from mechanical mountings. The second part can likewise be implemented as a patterned absorptive coating, embedded film, or opaque baffle layer conforming to the geometry of the optical structure.

In laminated or moulded versions of the optical structure, the first part and the second part may be fabricated in a single step using patterned photolithography or laser ablation to define the absorptive regions precisely relative to the folded optical path. Each part can have an optical density greater than 3 and extend laterally beyond the designed field of view by 1-3 mm to ensure full suppression of off-axis leakage while leaving the active optical aperture unobstructed.

Providing the straylight blocking interface as two laterally offset parts enables selective suppression of parasitic light originating from multiple stages of reflection in the folded HUD architecture. The first part prevents early-stage scatter or secondary reflections from the first reflective interface from coupling back into the optical structure, reducing background haze and internal flare. The second part eliminates late-stage ghost rays that could otherwise reflect from the non-TIR surface of the second transparent interface or from internal adhesive layers and reach the third semi-reflective interface.

By addressing these two optical paths independently, the design achieves a multi-stage straylight suppression strategy that preserves image contrast and clarity without compromising the active optical aperture or requiring additional bulky components. This localized blocking improves the modulation-transfer function (MTF) and ensures the perceived image exhibits a clean black background even under high ambient illumination.

From a mechanical standpoint, the separated first and second parts allow efficient integration within laminated or monolithic optical structures. Because each part occupies a peripheral region outside the main light-propagation path, it can be fabricated using standard coating or masking techniques with minimal additional alignment tolerance. The result is a lightweight, vibration-resistant assembly that maintains optical precision and reduces assembly complexity compared with external baffles.

Accordingly, the configuration in which the straylight blocking interface includes the first part and the second part provides targeted optical suppression of parasitic reflections from multiple interfaces, yielding higher contrast, improved image purity, and robust manufacturability in compact folded HUD systems.

Moreover, in some implementations, the first reflective interface, the second transparent interface and the straylight blocking interface are integrated into a single optical structure. Such integration may be realized by forming the first reflective interface and the straylight blocking interface on different facets of a common optical structure that also provides the boundary for the second transparent interface. For example, the first reflective interface may be deposited on a first facet of the optical structure, while the second transparent interface is defined at a second facet or an internal boundary of the same optical structure where total internal reflection (TIR) occurs. The straylight blocking interface may be provided as an embedded absorptive film or patterned coating on an opposite facet of the same optical structure, positioned to intercept parasitic light.

Integrating the first reflective interface, the second transparent interface, and the straylight blocking interface into a single optical structure yields a compact, self-contained optical structure that minimizes assembly tolerances and mechanical stack-up. Because the reflective, refractive, and absorptive elements share a common optical body, the optical path geometry is inherently stable under vibration and temperature variations, preserving the total-internal-reflection condition and alignment of the reflected light rays.

The integration also prevents straylight leakage along adhesive boundaries or mounting gaps, since the straylight blocking interface is embedded within the same optical structure that defines the reflective and TIR interfaces. This results in higher image contrast, improved long-term reliability, and simplified manufacturing.

Accordingly, unifying these interfaces within a single optical structure provides a low-profile, high-stability architecture that maintains optical precision and contrast while reducing part count and alignment effort in the folded HUD system.

Additionally, optionally, the third semi-reflective interface is also integrated into the single optical structure. In such an implementation, the first reflective interface, the second transparent interface, the straylight blocking interface, and the third semi-reflective interface are all formed on or within a common optical structure. For example, the first reflective interface may be deposited on a first facet of the optical structure, the second transparent interface may be defined as a second facet or an internal boundary supporting total internal reflection (TIR), the straylight blocking interface may be provided as an embedded absorptive region or patterned layer on an opposite facet, and the third semi-reflective interface may be formed on an outermost facet of the same optical structure.

Integrating the third semi-reflective interface into the same optical structure as the first reflective interface, the second transparent interface, and the straylight blocking interface further enhances compactness, rigidity, and optical precision. Because all reflective, refractive, and absorptive interfaces are co-located within a single monolithic or laminated element, the folded optical path remains permanently aligned, eliminating the cumulative tolerance errors that arise from separate mirror or combiner assemblies.

This integration also ensures that total internal reflection and semi-reflective combination occur within the same thermally and mechanically stable optical medium, preserving focus and registration over time and environmental stress. The embedded straylight blocking interface continues to suppress parasitic reflections internally, maintaining high contrast without the need for external baffles.

Accordingly, integrating the third semi-reflective interface into the single optical structure provides a fully self-contained optical assembly that offers exceptional stability, reduced part count, and superior image contrast in a minimal-volume HUD system suitable for high-precision vehicular applications.

The present disclosure also relates to the vehicle comprising the HUD system. Various embodiments and variants disclosed above, with respect to the aforementioned first aspect, apply mutatis mutandis to the vehicle.

DETAILED DESCRIPTION OF THE DRAWINGS

FIG. 1A is a schematic illustration of a heads-up display (HUD) system 100, in accordance with an embodiment of the present disclosure. The HUD system 100 comprises:

a display 102 employed to emit light rays;

a first reflective interface 104 arranged obliquely along an optical path of the light rays emitted from the display 102;

a second transparent interface 106 being obliquely oriented with respect to the optical path of the light rays reflected from the first reflective interface 104, wherein the light rays, after reflection from the first reflective interface 104, are incident on the second transparent interface 106 from within a first optical medium, the second transparent interface 106 being a boundary between the first optical medium having a first refractive index (n1) and a second optical medium having a second refractive index (n2) that is smaller than the first refractive index, and wherein the light rays are incident on the boundary at angles greater than a critical angle for the first optical medium and the second optical medium, whereby the light rays undergo total internal reflection; and a third semi-reflective interface 108 arranged obliquely along the optical path of the light rays reflected from the second transparent interface 106, the third semi-reflective interface 108 being oriented to reflect the light rays toward an eyebox 110 of the HUD system 100, while optically combining the light rays with a real-world light field.

In FIG. 1A, the eyebox 110 is schematically indicated. It will be appreciated that the eyebox 110 is not a physical structure, but a three-dimensional volume within which a user's eyes can be positioned to view images displayed by the HUD system 100. For clarity of illustration, FIG. 1A also depicts representative light rays directed toward a user's eyes 112; the number, thickness, and angles of the rays are schematic and not to scale.

Figure 1B:
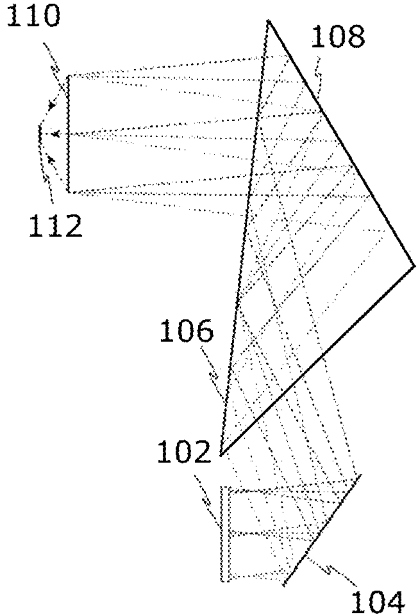
FIGS. 1B and 1C depict a first example implementation and a second example implementation of the HUD system in which at least two of three interfaces are integrated into a single optical structure, in accordance with different embodiments of the present disclosure.
Figure 1C:
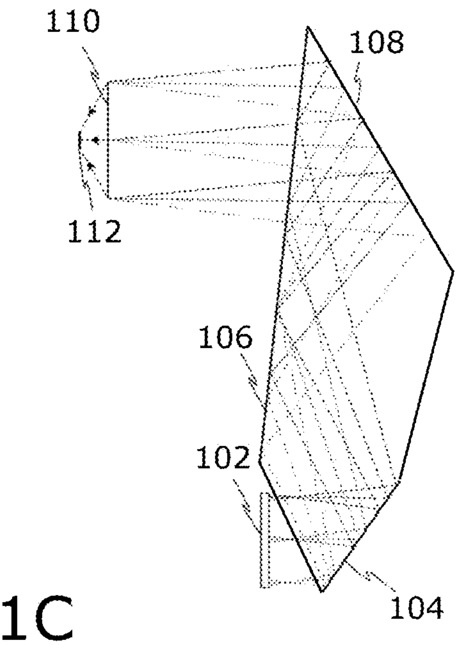

Moreover, for clarity of illustration, the first reflective interface 104, the second transparent interface 106 and the third semi-reflective interface 108 have been indicated using separate lines in FIG. 1A. In some implementations, at least two of these three interfaces could be integrated into a single optical structure. For illustration purposes, FIGS. 1B and 1C respectively depict a first example implementation and a second example implementation of the HUD system 100, in accordance with different embodiments of the present disclosure. In the first example implementation depicted in FIG. 1B, the second transparent interface 106 and the third semi-reflective interface 108 are integrated into a single optical structure, while the first reflective interface 104 remains a separate optical element. In the second example implementation depicted in FIG. 1C, the first reflective interface 104, the second transparent interface 106 and the third semi-reflective interface 108 are integrated into a single optical structure.

FIGS. 1D, 1E, 1F and 1G depict different implementations of the second transparent interface 106 in the HUD system 100, in accordance with various embodiments of the present disclosure. In these implementations, the second transparent interface 106 is arranged between the display 102 and the first reflective interface 104 such that the light rays emitted from the display 102 pass through the second transparent interface 106 toward the first reflective interface 104 and, after reflection from the first reflective interface 104, are incident on the second transparent interface 106 from within the first optical medium.

Figure 1D:
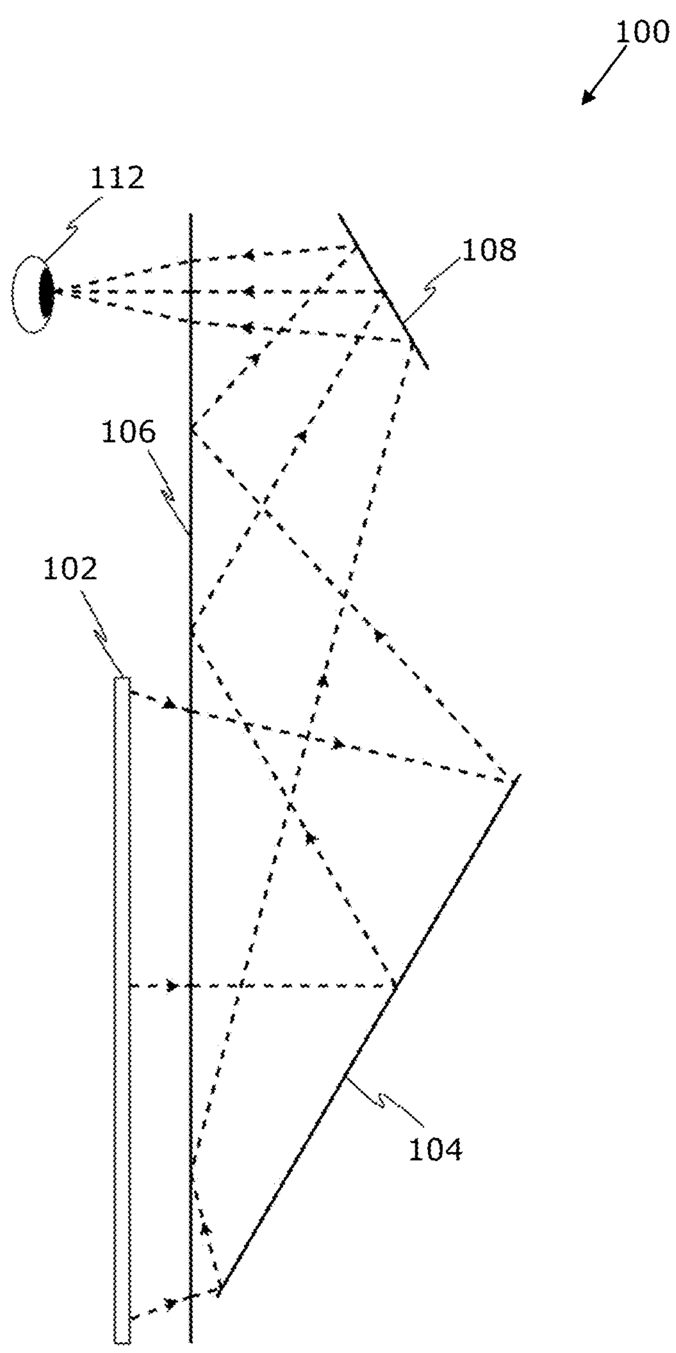
FIGS. 1D, 1E, 1F and 1G depict different implementations of the HUD system in which a second transparent interface is arranged between a display and a first reflective interface, in accordance with various embodiments of the present disclosure.

FIG. 1D depicts a third example implementation of the HUD system 100 in which the second transparent interface 106 lies in the optical path of the light rays reflected from the third semi-reflective interface 108. However, because the incident angles of those rays do not exceed the critical angle, the light rays reflected from the third semi-reflective interface 108 do not undergo total internal reflection at the second transparent interface 106, and instead pass through the second transparent interface 106 toward the eyebox 110.

Figure 1E:
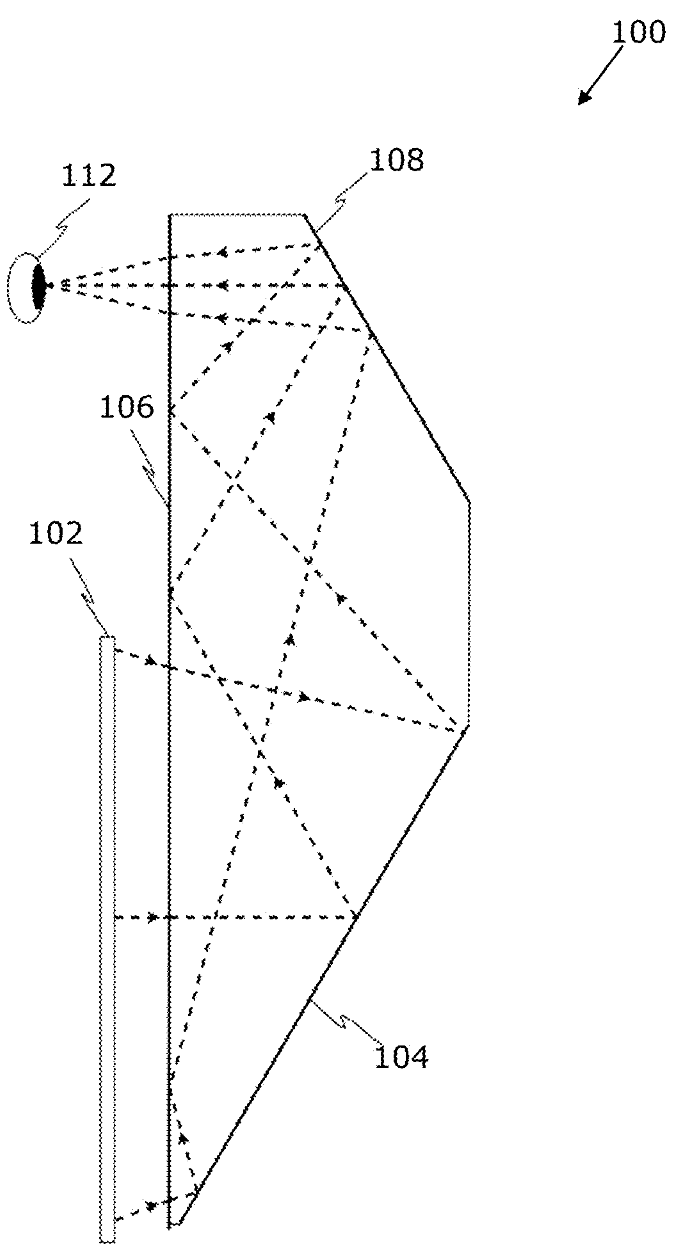

FIG. 1E depicts a fourth example implementation of the HUD system 100 that is similar to the third example implementation of the HUD system 100 in terms of the placement of the second transparent interface 106 on the optical path of the light rays reflected from the third semi-reflective interface 108. In the fourth example implementation depicted in FIG. 1E, the first reflective interface 104, the second transparent interface 106 and the third semi-reflective interface 108 are integrated into a single optical structure.

Figure 1F:
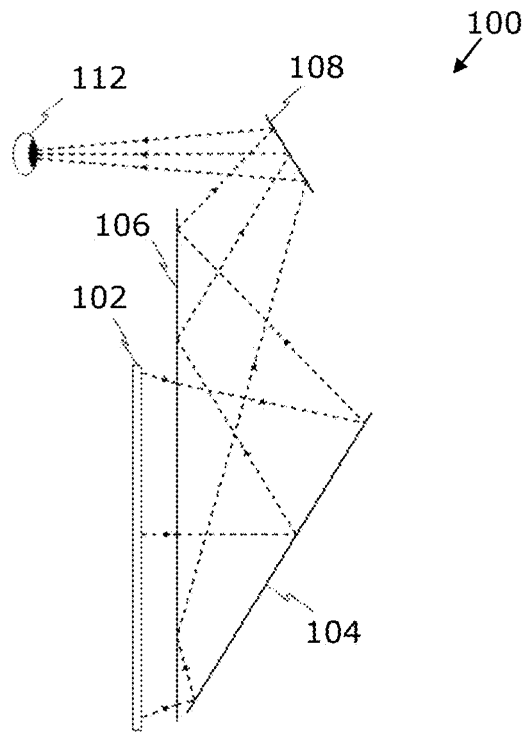

FIG. 1F depicts a fifth example implementation of the HUD system 100 in which the second transparent interface 106 does not lie in the optical path of the light rays reflected from the third semi-reflective interface 108.

Figure 1G:
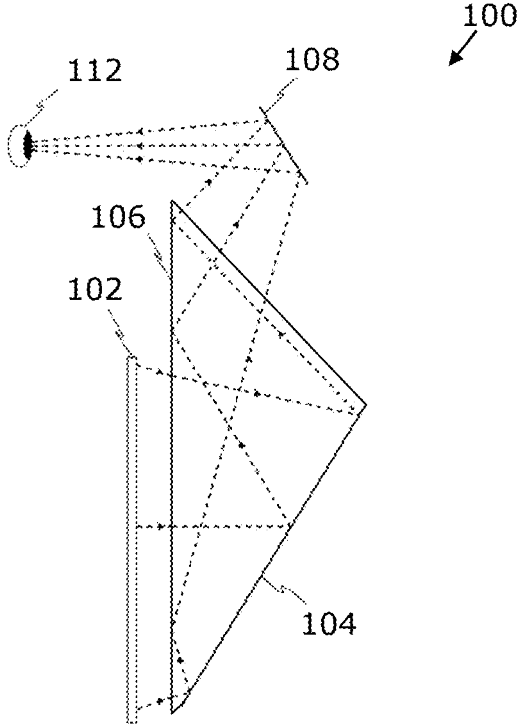

FIG. 1G depicts a sixth example implementation of the HUD system 100 that is similar to the fifth example implementation of the HUD system 100 in terms of the placement of the second transparent interface 106 outside the optical path of the light rays reflected from the third semi-reflective interface 108. In the sixth example implementation depicted in FIG. 1G, the first reflective interface 104 and the second transparent interface 106 are integrated into a single optical structure, while the third semi-reflective interface 108 remains a separate optical element.

A person skilled in the art will recognize many variations, alternatives, and modifications of embodiments of the present disclosure. It will be appreciated that the relative angular configuration between these interfaces may vary according to design constraints and desired field-of-view geometry. For example, the second transparent interface 106 could be oriented at a different angle with respect to the first reflective interface 104.

Figure 1H:
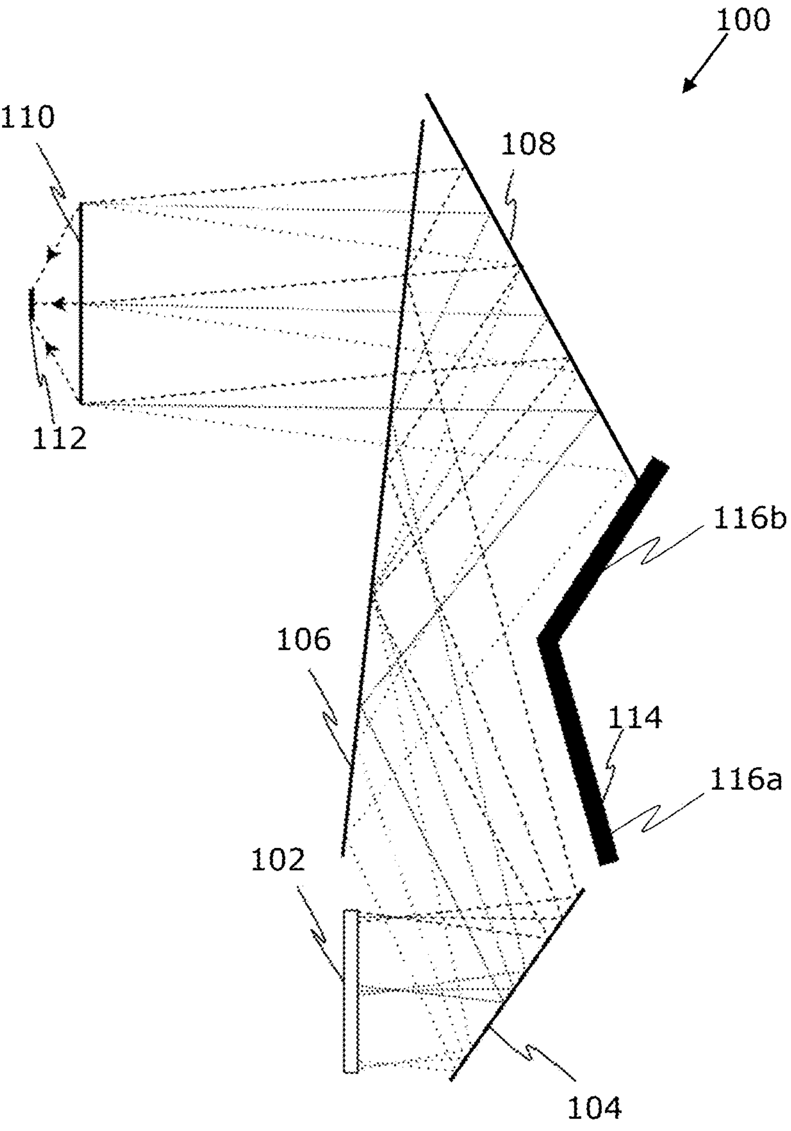
FIG. 1H depicts an optional implementation in which the HUD system further comprises a straylight blocking interface, in accordance with an embodiment of the present disclosure.

Furthermore, FIG. 1H depicts an optional implementation of the HUD system 100, in accordance with an embodiment of the present disclosure. Optionally, the HUD system 100 further comprises a straylight blocking interface 114 arranged opposite to the second transparent interface 106, between the first reflective interface 104 and the third semi-reflective interface 108.

More optionally, the straylight blocking interface 114 comprises:

a first part 116*a* arranged laterally offset from the optical path of the light rays reflected from the first reflective interface 104 toward the second transparent interface 106; and a second part 116*b* arranged laterally offset from the optical path of the light rays reflected from the second transparent interface 106 toward the third semi-reflective interface 108.

Figure 1I:
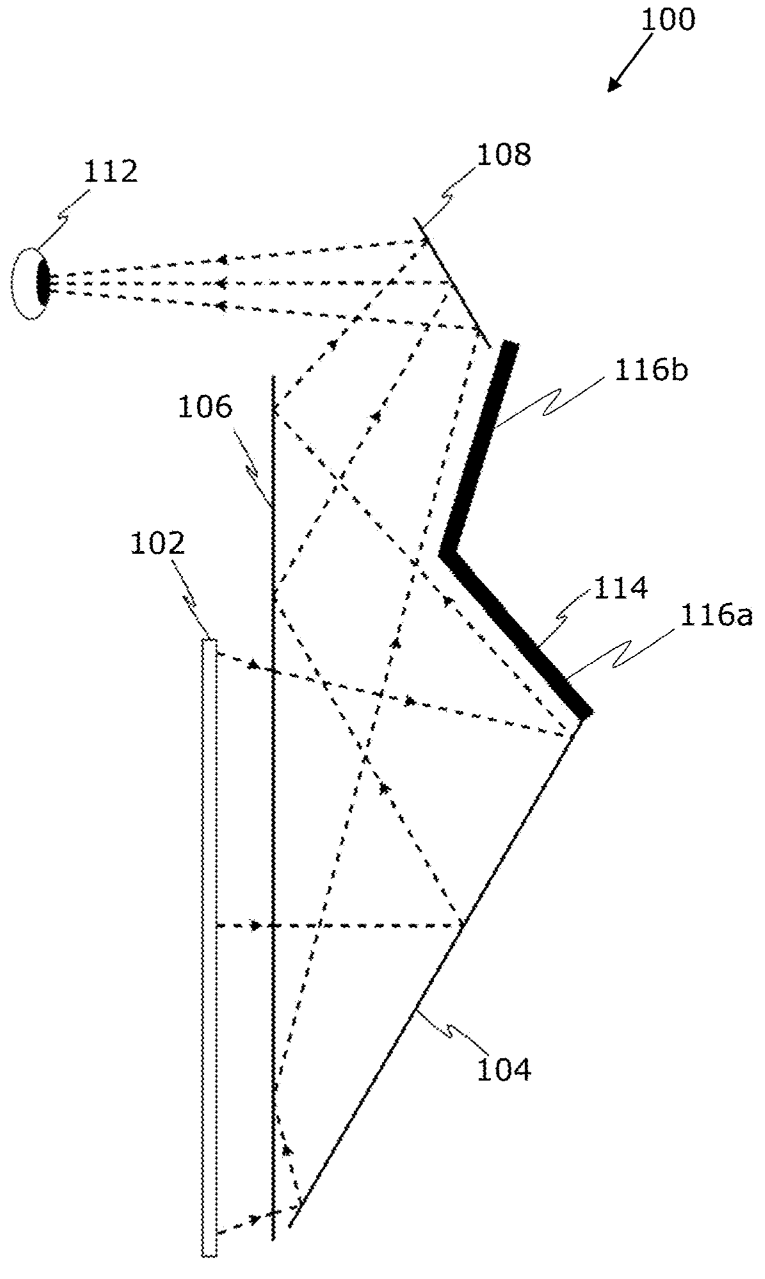
FIGS. 1I and 1J depict different optional implementations of the second transparent interface with the straylight blocking interface, in accordance with various embodiments of the present disclosure.
Figure 1J:
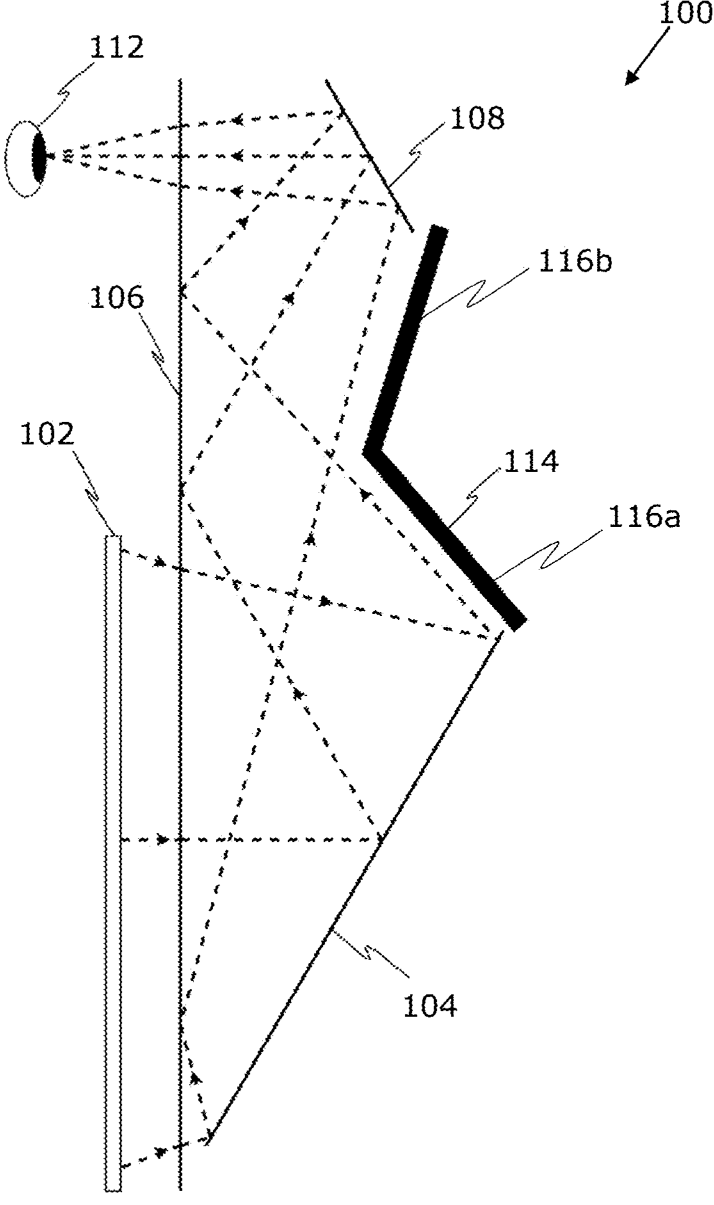

FIGS. 1I and 1J depict different optional implementations of the second transparent interface 106 in the HUD system 100 with the straylight blocking interface 114, in accordance with various embodiments of the present disclosure.

Figure 1K:
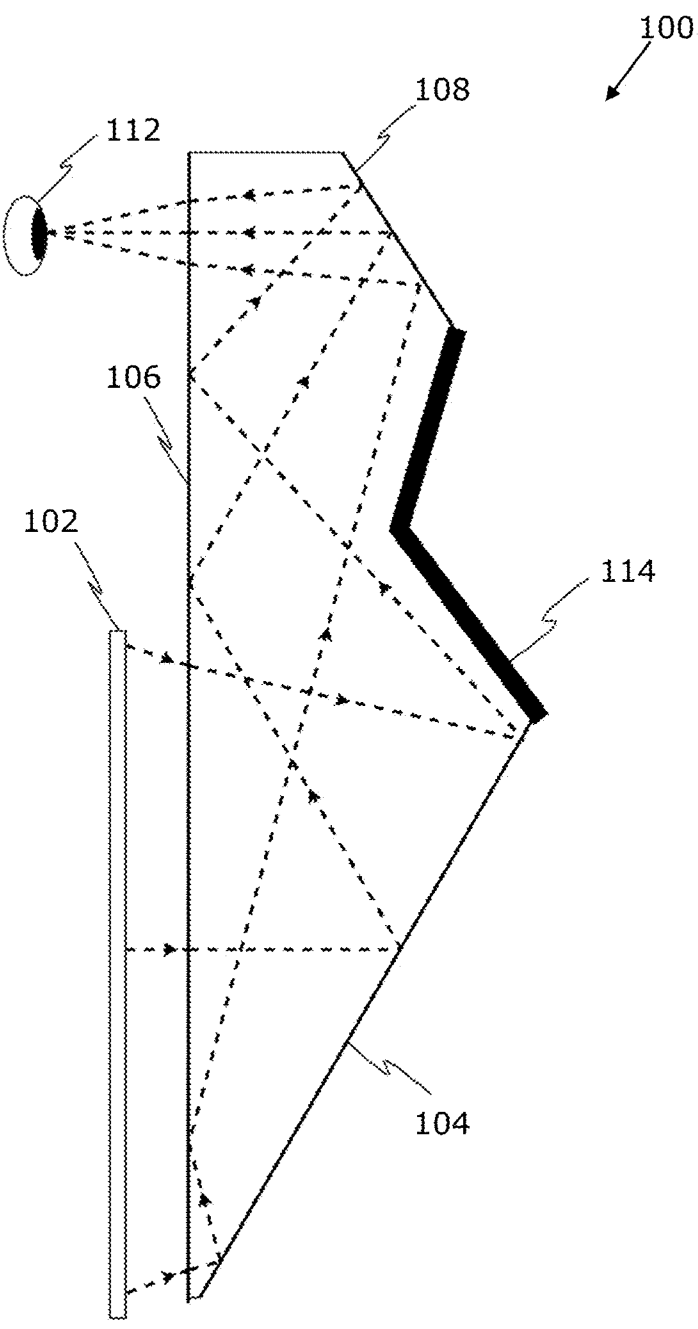
FIG. 1K depicts an optional implementation of the HUD system in which the first reflective interface, the second transparent interface, the third semi-reflective interface and the straylight blocking interface are integrated into a single optical structure, in accordance with an embodiment of the present disclosure.

FIG. 1K depicts an optional implementation of the HUD system 100 in which the first reflective interface 104, the second transparent interface 106, the third semi-reflective interface 108 and the straylight blocking interface 114 are integrated into a single optical structure, in accordance with an embodiment of the present disclosure.

It may be understood by a person skilled in the art that FIGS. 1A-1K include simplified example implementations of the HUD system 100 and how it works, for sake of clarity, which should not unduly limit the scope of the claims herein. It is to be understood that the specific implementation of the HUD system 100 is not to be construed as limiting it to specific types, shapes or arrangements of the display 102, the first reflective interface 104, the second transparent interface 106, the third semi-reflective interface 108, and the straylight blocking interface 114. The person skilled in the art will recognize many variations, alternatives, and modifications of embodiments of the present disclosure.

The invention claimed is:

1. A heads-up display (HUD) system comprising:

a display employed to emit light rays;

a first reflective interface arranged obliquely along an optical path of the light rays emitted from the display;

a second transparent interface obliquely oriented with respect to the optical path of the light rays reflected from the first reflective interface, wherein the light rays, after reflection from the first reflective interface, are incident on the second transparent interface from within a first optical medium, the second transparent interface being a boundary between the first optical medium having a first refractive index (n1) and a second optical medium having a second refractive index (n2) that is smaller than the first refractive index, and wherein the light rays are incident on the boundary at angles greater than a critical angle for the first optical medium and the second optical medium, whereby the light rays undergo total internal reflection; and a third semi-reflective interface arranged obliquely along the optical path of the light rays reflected from the second transparent interface, the third semi-reflective interface being oriented to reflect the light rays toward an eyebox of the HUD system, while optically combining the light rays with a real-world light field, wherein the first reflective interface, the second transparent interface and the third semi-reflective interface are integrated into a single optical structure.

2. The HUD system of claim 1, wherein the second transparent interface is arranged between the display and the first reflective interface such that the light rays emitted from the display pass through the second transparent interface toward the first reflective interface and, after reflection from the first reflective interface, are incident on the second transparent interface from within the first optical medium.

3. The HUD system of claim 1, wherein the third semi-reflective interface comprises a polarization-selective coating that reflects light rays having a polarization orientation within a predefined range, and the display is configured to emit the light rays having a polarization orientation within the predefined range.

4. The HUD system of claim 1, wherein the third semi-reflective interface has a curvature in a first meridional direction.

5. The HUD system of claim 4, wherein the third semi-reflective interface is a biconic surface having a curvature in the first meridional direction.

6. The HUD system of claim 4, wherein the display is configured to emit the light rays having an angular distribution that is more collimated in a second meridional direction orthogonal to the first meridional direction.

7. The HUD system of claim 1, further comprising a straylight blocking interface arranged opposite to the second transparent interface, between the first reflective interface and the third semi-reflective interface.

8. The HUD system of claim 7, wherein the straylight blocking interface comprises:

a first part arranged laterally offset from the optical path of the light rays reflected from the first reflective interface toward the second transparent interface; and a second part arranged laterally offset from the optical path of the light rays reflected from the second transparent interface toward the third semi-reflective interface.

9. The HUD system of claim 7, wherein the first reflective interface, the second transparent interface and the straylight blocking interface are integrated into a single optical structure.

10. The HUD system of claim 9, wherein the third semi-reflective interface is also integrated into the single optical structure.

11. The HUD system of claim 1, wherein the third semi-reflective interface is a user-facing surface of a windshield of a vehicle in which the HUD system is installed.

12. A vehicle comprising the heads-up display system of claim 1.

13. The HUD system of claim 1, wherein a surface normal of the first reflective interface forms a first obtuse angle with a surface normal of the display, the first obtuse angle lying within a range of 135 degrees to 150 degrees.

* * * * *